US010528808B2

(12) United States Patent
Lozano et al.

(10) Patent No.: US 10,528,808 B2
(45) Date of Patent: Jan. 7, 2020

(54) AUTOMATED DOCUMENT PROCESSING SYSTEM

(71) Applicant: Orbiion, Inc., Redwood City, CA (US)

(72) Inventors: Miguel A. Galarza Lozano, Redwood City, CA (US); Jose Luis Medellin Garibay, San Luis Potosi (MX)

(73) Assignee: Orbiion, Inc., Redwood City, CA (US)

( * ) Notice: Subject to any disclaimer, the term of this patent is extended or adjusted under 35 U.S.C. 154(b) by 17 days.

(21) Appl. No.: 15/561,815

(22) PCT Filed: Apr. 20, 2016

(86) PCT No.: PCT/US2016/028505
§ 371 (c)(1),
(2) Date: Sep. 26, 2017

(87) PCT Pub. No.: WO2016/172257
PCT Pub. Date: Oct. 27, 2016

(65) Prior Publication Data
US 2018/0114060 A1 Apr. 26, 2018

Related U.S. Application Data

(60) Provisional application No. 62/150,698, filed on Apr. 21, 2015.

(51) Int. Cl.
*G06K 9/00* (2006.01)
*G06F 16/93* (2019.01)
(Continued)

(52) U.S. Cl.
CPC ......... *G06K 9/00483* (2013.01); *G06F 16/93* (2019.01); *G06K 9/00449* (2013.01); *G06K 9/2054* (2013.01); *G06Q 10/10* (2013.01)

(58) Field of Classification Search
CPC ........... G06K 9/00483; G06K 9/00449; G06K 9/2054; G06F 16/93; G06F 16/00; G06F 17/2705; G06Q 10/10
See application file for complete search history.

(56) References Cited

U.S. PATENT DOCUMENTS

2008/0253656 A1* 10/2008 Schwartzberg ...... G06K 9/3258
382/181
2008/0285792 A1* 11/2008 Comay ................. G06F 17/243
382/100
(Continued)

OTHER PUBLICATIONS

Patent Cooperation Treaty, International Search Report and Written Opinion of the International Searching Authority, International Patent Application No. PCT/US2016/028505, dated Aug. 4, 2016, 14 Pages.

*Primary Examiner* — Ping Y Hsieh
(74) *Attorney, Agent, or Firm* — Fenwick & West LLP

(57) ABSTRACT

Disclosed is a document processing system that can be used to automatically detect and process an invoice for a business entity. The system receives a document and determines the structural information from the document. The structural information includes a template object and its location on the document. The system further retrieves structural information of documents stored in the database and compares the structural information of retrieved documents to the received document based on matching criteria such as a template object name and its location. If a match is found within a predefined threshold range, the data is extracted from the received document and the structural information is extracted from the matching document and the received document is processed by applying the extracted data to the corresponding extracted structural information. The pro-
(Continued)

cessed document is transmitted for a user review or for processing by an accounting or bookkeeping software application.

20 Claims, 6 Drawing Sheets

(51) Int. Cl.
*G06Q 10/10* (2012.01)
*G06K 9/20* (2006.01)

(56) References Cited

U.S. PATENT DOCUMENTS

2013/0236111 A1\* 9/2013 Pintsov .............. G06K 9/00483
  382/224
2015/0012442 A1\* 1/2015 Ceribelli ............ G06Q 20/1085
  705/45

\* cited by examiner

AUTOMATED DOCUMENT PROCESSING SYSTEM

CROSS REFERENCE TO RELATED APPLICATIONS

This application claims the benefit of U.S. Provisional Application No. 62/150,698, filed Apr. 21, 2015, which is incorporated by reference in its entirety.

BACKGROUND

1. Field of Art

The disclosure generally relates to the field of document processing, and more specifically, to automating invoice recognition and processing for profit and non-profit entities.

2. Description of the Related Art

Many business entities, both profit and non-profit receive invoices from their customers or vendors on a daily basis. Keeping track of the invoices, processing them and maintaining the payment dates is a challenge for the businesses. Most of the invoice management tasks are manual processes or partially automated processes, thus prone to human error. Additionally, as the businesses grow, the processes need to support scalability.

The partially automated processes do not detect incoming invoices, nor do they automatically tag the invoices. The process requires a user to enter details related to the invoice and categorize the invoice accordingly.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
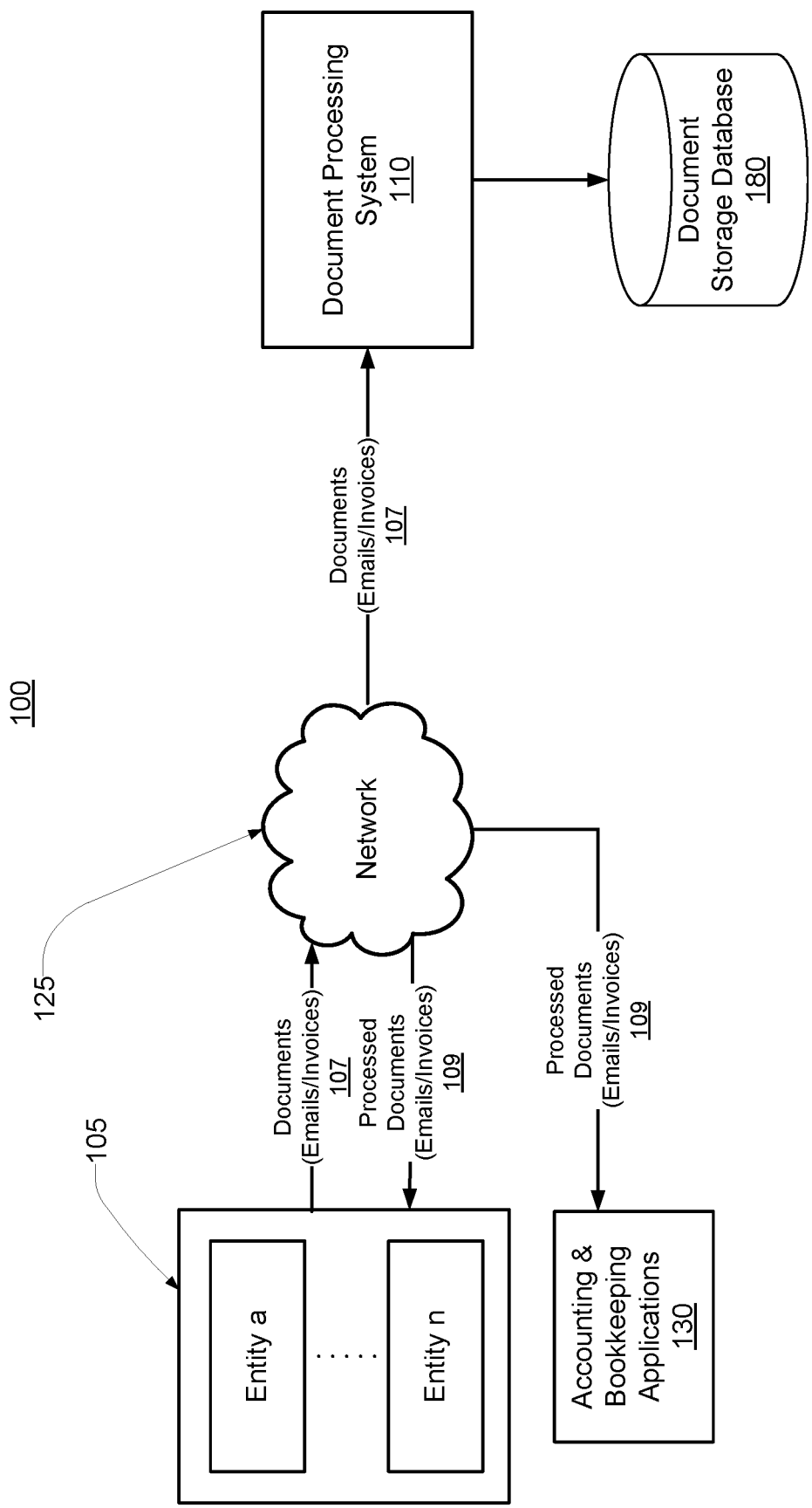
FIG. 1 illustrates an example embodiment of an environment a document processing system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One example embodiment of a disclosed system, method, and a computer program product (comprised of a computer readable storage medium storing computer instructions thereon) may include a document processing system that can be used to detect, retrieve, tag and process an invoice for a business entity. The system receives an electronic form of a document, decrypts the document, searches for a match of the document from the database, processes the document by extracting the data based on the matched document and categorizes and organizes the processed document for a user review or for processing by an accounting or bookkeeping software application.

In one example embodiment, the document processing system 110 is an invoice processing system. The system receives a document that may be an unprocessed invoice. The system is configured to convert the document to a binary file that includes structural information of the document. The system searches a document storage database to find a matching document (or binary of a document) based on the extracted structural information of the received document. If a 100% match is found, the matched binary is used to extract the co-ordinates for the various fields of the invoice and the data corresponding to the fields are extracted from the current binary. The received document is processed by applying the data extracted from the current binary to the various field information extracted from the matched binary. Once the data is applied, the system may further process the document to perform accounts payable activities such as determining an amount due to a business entity, a due date or other such activities. The processed invoice may be further tagged with an associated expense account or a business entity that the invoice associates with. The processed invoice is sent to the bookkeeping or accounting software application to pay the invoice or sent to an appropriate user of the business entity to approve the processed invoice.

If a match is not found in the document database, the binary is treated as a new invoice binary and the structural information is discovered by extracting template objects representing the fields of the invoice along with the location of the fields on the invoice. Once the structural information is extracted, the binary is tagged with a business entity tag (for example, the business entity name, location and date of entry) and stored in the document storage database.

Example System Configuration

Referring now to FIG. (FIG. 1, illustrated is an example embodiment of an environment for an invoice processing system 100 for one or more business entities 105a-n (n being the nth business entity) (generally 105). The invoice processing system 110 functions as a digital accounts payable department for the business entities 105 of all sizes. The business entity 105 can be a profit or a non-profit entity, for example, a commercial business in any industry such as a restaurant, fitness studio, manufacturing company or an educational institution or a government agency. A document of a particular business entity 105 may have a specific format, for example, a restaurant invoice may include a field for adding a tip, and an educational institution may include a field indicating a scholarship/award amount and other such specific formats. The invoice processing system 110 automates the process of collecting and managing incoming invoices for such business entities 105.

The set of business entities 105 communicate with the invoice processing system 110 via a network 125. The invoice processing system 110 receives an electronic form of an unprocessed document 107 over the network 125 via email or scanned invoices and processes the document. The document processing includes identifying pre-determined template objects in a document, for example, text such as name- or location or an image such as a logo. The document processing also may include identifying a location of the template object on the document. The document processing also may include searching the document storage database 180 for a template object and location match. When a match is found, the document processing may extract the field information from the matched invoice, extract data from the received invoice, and apply the data to the corresponding extracted fields. Accordingly, the processing may generate a processed invoice 109. The processed invoice 109 may be tagged with relevant business entity information and sent to the respective business entities 105 for approval or is sent to the accounting or bookkeeping applications 130 for further processing.

Figure 2:
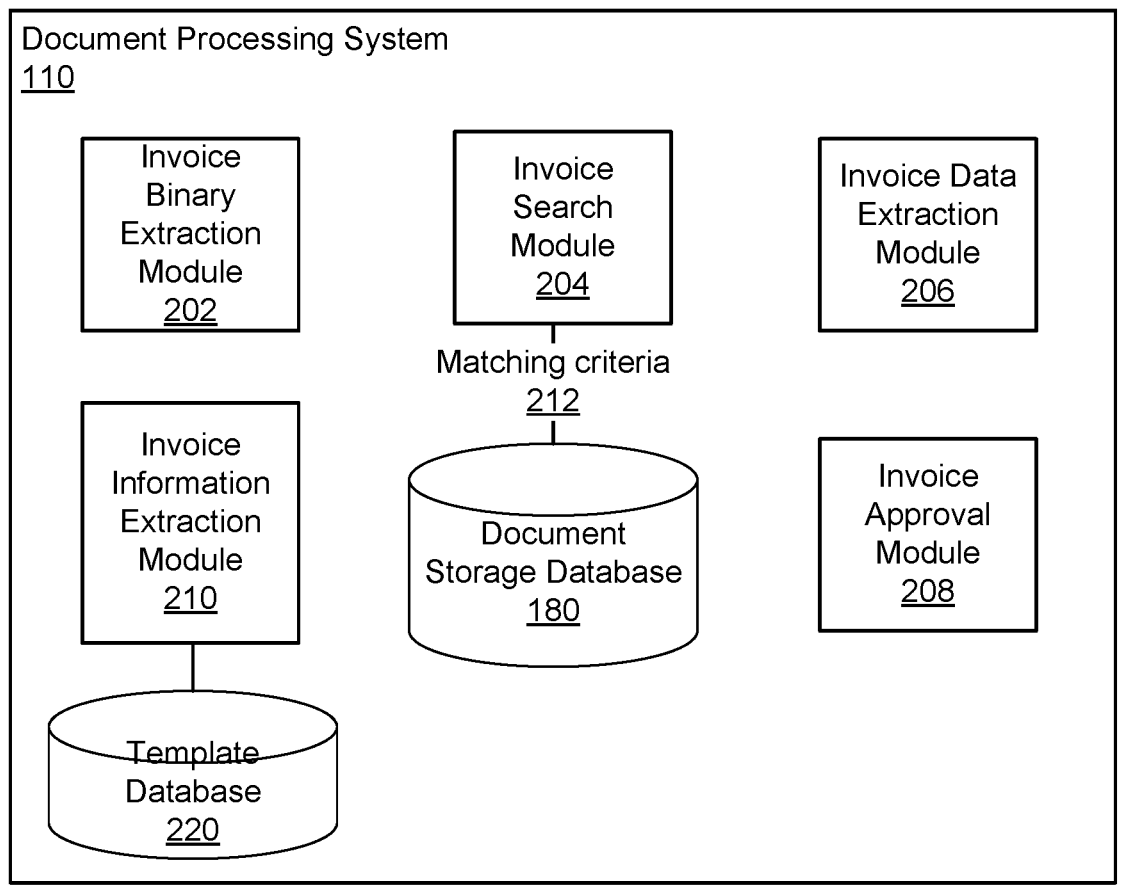
FIG. 2 illustrates an example embodiment of the functional components of a document (e.g. invoice) processing system.

Referring now to FIG. 2, illustrated is an example embodiment of functional components of the document (invoice) processing system. The functional components include an invoice binary extraction module 202, an invoice search module 204, an invoice data extraction module 206, an invoice approval module 208 and a new invoice information extraction module 210.

The invoice binary extraction module 202 receives the unprocessed invoices from the business entities 105. The unprocessed invoices may be sent via an electronic medium such as email or scanned documents that are sent over the network 125. The invoice binary extraction module 202 extracts the binary of the unprocessed invoices. The invoice binary is extracted per page. In case the document is more than a page, all the pages are binarized separately. The binary extraction process includes searching for template objects such as invoice number, invoice date, due date, line item descriptions, line items stock keeping units', line item names, line item totals, line item tax rates, invoice subtotal, tax etc. that indicate fields on an invoice. Additionally, along with the detection of invoice fields, the location of the fields are determined, the location is indicated by horizontal and vertical co-ordinates of the fields on the unprocessed invoice. The invoice binary is sent to the invoice search module 204 to search for similar binaries that are stored in the document storage database 180.

The invoice search module 204 receives the binarized invoice document and queries the document storage database 180 to find a matching binary by comparing the received invoice binary to the previously stored binaries in the document storage database 180. If a previously stored binary reaches a predefined threshold for a comparison match (N %), e.g., an 80% comparison match, it is added to a list of potential candidate for a match. A set of potential candidate binaries are further compared with the received invoice binary to find a match at a higher threshold (P %, P>N), e.g., ideally a 100% match. Alternately, it is noted that a match may be within a predetermined range above the threshold but less than 100%, i.e. within a threshold range, for example, between 95% and 100%. By way of example, once the 100% match is found the matched binary and the received invoice binary are sent to the invoice data extraction module 206. If the match above the threshold is not found in the document storage database 180 the received invoice binary is sent to the invoice information extraction module 210 to discover the invoice information and store it in the document storage database 180.

The invoice data extraction module 206 captures the data from the received invoice binary, extracts the fields and co-ordinate information from the matched invoice binary and processes the received invoice by applying the data in the extracted fields. The processed invoice is tagged and stored in the document storage database 180 and sent to the invoice approval module 208.

The processed invoice is sent to the user for a review, or it may be sent to a bookkeeping software application by the invoice approval module 208. The invoice approval module 208 includes a configurable setting to select the recipient of the processed invoice. In the scenario, where the processed invoice is sent for a user review, user may approve the invoice or may reject the invoice and record rejection metrics. The invoice approval module 208 analyzes the rejection metrics and corrects the errors and re-sends it for user approval. Once the processed invoice is approved, the approval metrics are stored in the document storage database 180.

The invoice information extraction module 210 retrieves template objects from the template database 220. A document type may have a standard template, for example, a resume may have a standard template that is commonly used, or an invoice may have a template that is in frequent use. Each document template may include keywords that identify the document or are located within a certain portion of the document. For example, a resume template may include field names such as name, address, education, etc. Such keywords are generally termed as template objects. Example template objects for an invoice include invoice number label, reference number label, organization name, due date label, subtotal label, total value and other such terms. Additionally, a template object may be an image, graphics, bitmaps such as a logo of a business entity or a generic image indicating a recognized invoice field, for example a "$" bitmap for the field indicating invoice amount.

For an invoice binary that did not find a matching binary in the document storage database 180, the invoice information extraction module 210 extracts the binary of the unprocessed invoice and stores it in the document storage database 180. To extract the binary, the invoice information extraction module 210 searches for the template objects within the unprocessed invoice. Once a template object is found, their location including the co-ordinate positions (e.g., x-y planar coordinates relative to a page or portions of a page) on the invoice are determined. The template term is associated with the co-ordinate position and the association is stored in the document storage database 180, along with a tag identifying the invoice.

Figure 3:
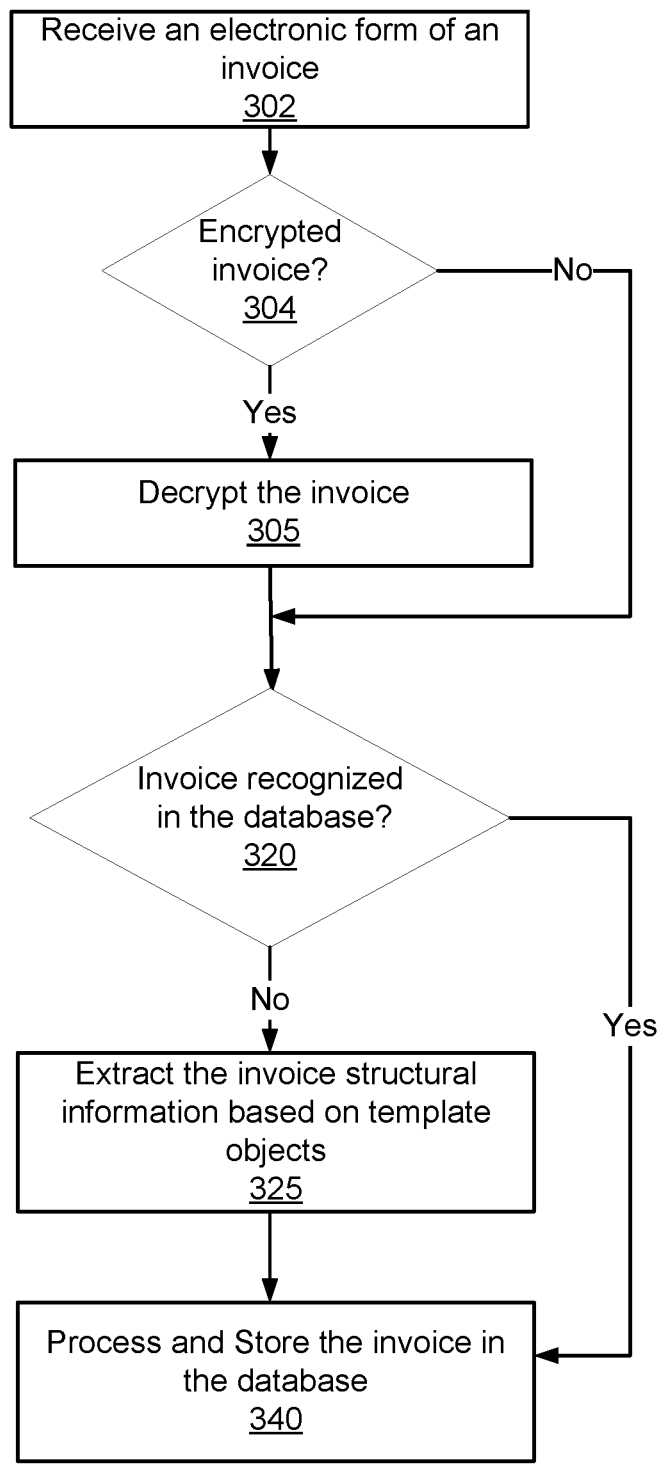
FIG. 3 illustrates an example embodiment of steps performed for processing an invoice.

Referring now to FIG. 3, illustrated is an example embodiment of steps performed by the document processing system on receiving an invoice. The document processing system 110 receives 302 an invoice in an electronic form, for example, as an email attachment, a scanned copy of the invoice or an uploaded image or pdf file. The file may be encrypted, for example, a pdf file may have the optical character recognition disabled, the document processing system 110 detects 304 if the invoice is encrypted, and decrypts 305 the invoice. On decryption, or in case the received invoice is not encrypted, the invoice is sent to be recognized 320 (i.e., find a match) from the stored invoices in the database. If a match for the invoice is found, the data from the received invoice is extracted based on the structure information from the matched invoice, and the invoice is processed and stored 340 in the database along with the matched invoice. If a match for the invoice is not found, the structural information of the received invoice is extracted 325 based on pre-determined template objects. The process of recognizing an invoice is explained in detail in FIG. 4 and the process of extracting structural information based on template objects is explained in FIG. 5.

Figure 4:
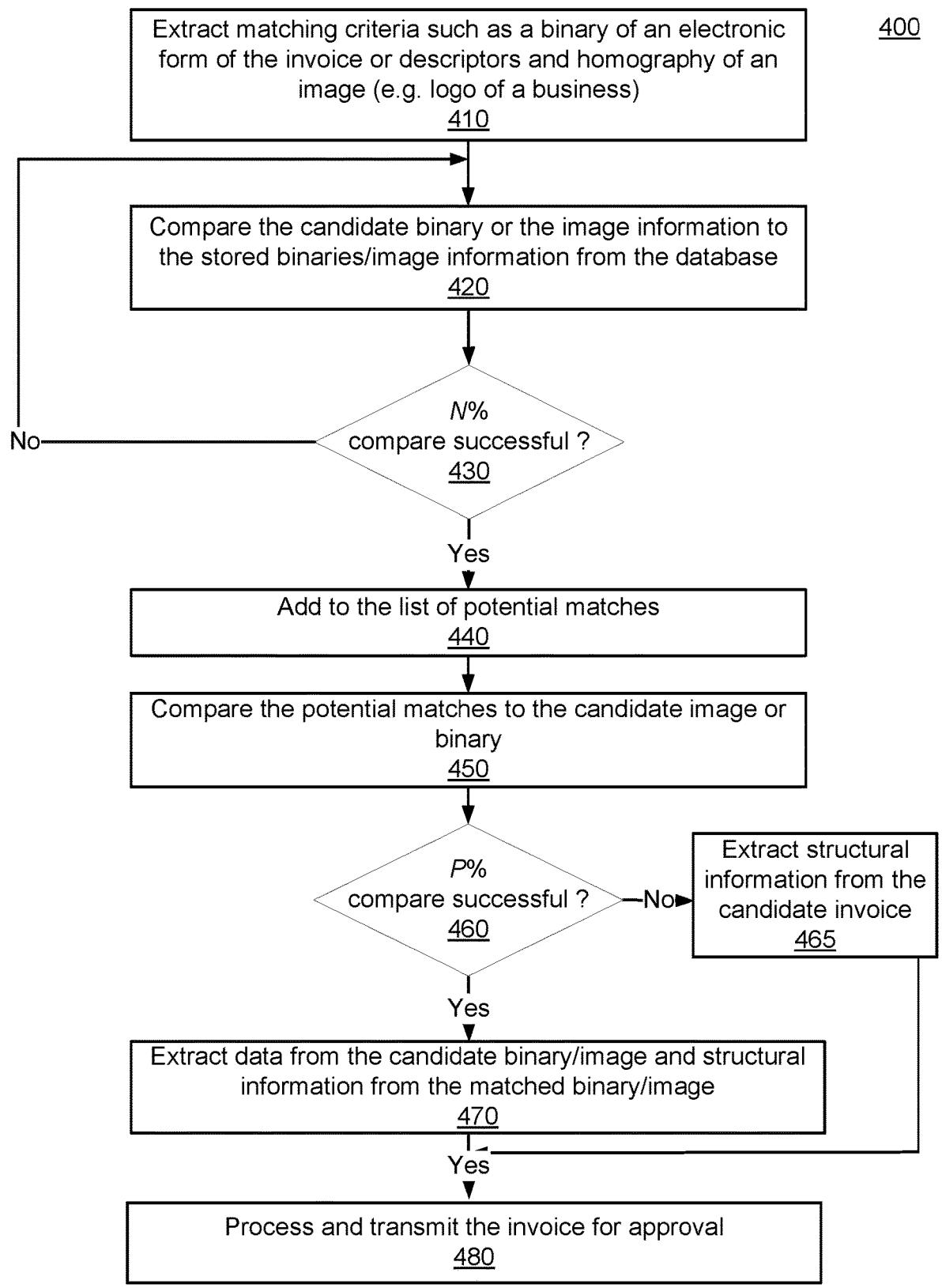
FIG. 4 illustrates an example embodiment of steps performed for recognizing an invoice.

Referring now to FIG. 4, illustrated is an example embodiment of steps performed in recognizing an invoice to either find a match for an incoming invoice or to extract structural information from the incoming invoice in case a match isn't found. The document processing system receives and detects an invoice by searching for a template object. A template object may be a field name (i.e. text) such as "invoice" or "bill" or an image such as a logo or other terms stored in the template database 220. Once an invoice is detected, a matching criterion is extracted from the incoming invoice. The matching criteria may include matching the structural information i.e. the template object and its location on the invoice, or an image such as a business entity logo and its location on the invoice. The matching criteria is extracted 410 from the incoming invoice by either binarizing the invoice, termed as the candidate binary, or extracting the graphic symbol described by a set of descriptors and homographic information related to the bitmap of the image on the invoice termed as the candidate image. The candidate binary or the image information is compared 420 to the stored binaries/image information, retrieved from the document storage database. If the stored binary/image information reaches a predefined threshold success match (N %) 430, e.g., an 80% successful match, the stored binary/image information is added 440 to a list of potential matches. The potential matches are further compared 450 to the candidate binary/image information to find a higher success match that may be predefined (P %; N<P). Ideally, this match would be a 100% successful match, but could be a smaller threshold, e.g., 95%.

Using as an example P=100, if a 100% successful match is found 460, the structural information of the invoice is extracted 470 from the stored/matched invoice. The data is extracted 470 from the candidate invoice and is applied to the extracted structure from the stored invoice, thus automating the process of manually entering the invoice information. In case a 100% match is not found, the structural information from the candidate invoice is extracted 465. The structural information may include recognizing template objects and their locations on the invoice, explained in detailed in FIG. 5. Once the data is extracted from the incoming invoice and is applied to the structural information of the invoice, the processed invoice is generated and transmitted 480 to a reviewer for approval. The process invoiced may be transmitted via electronic communication such as an email, push notification or a message that can be accessed by a computing device.

Figure 5:
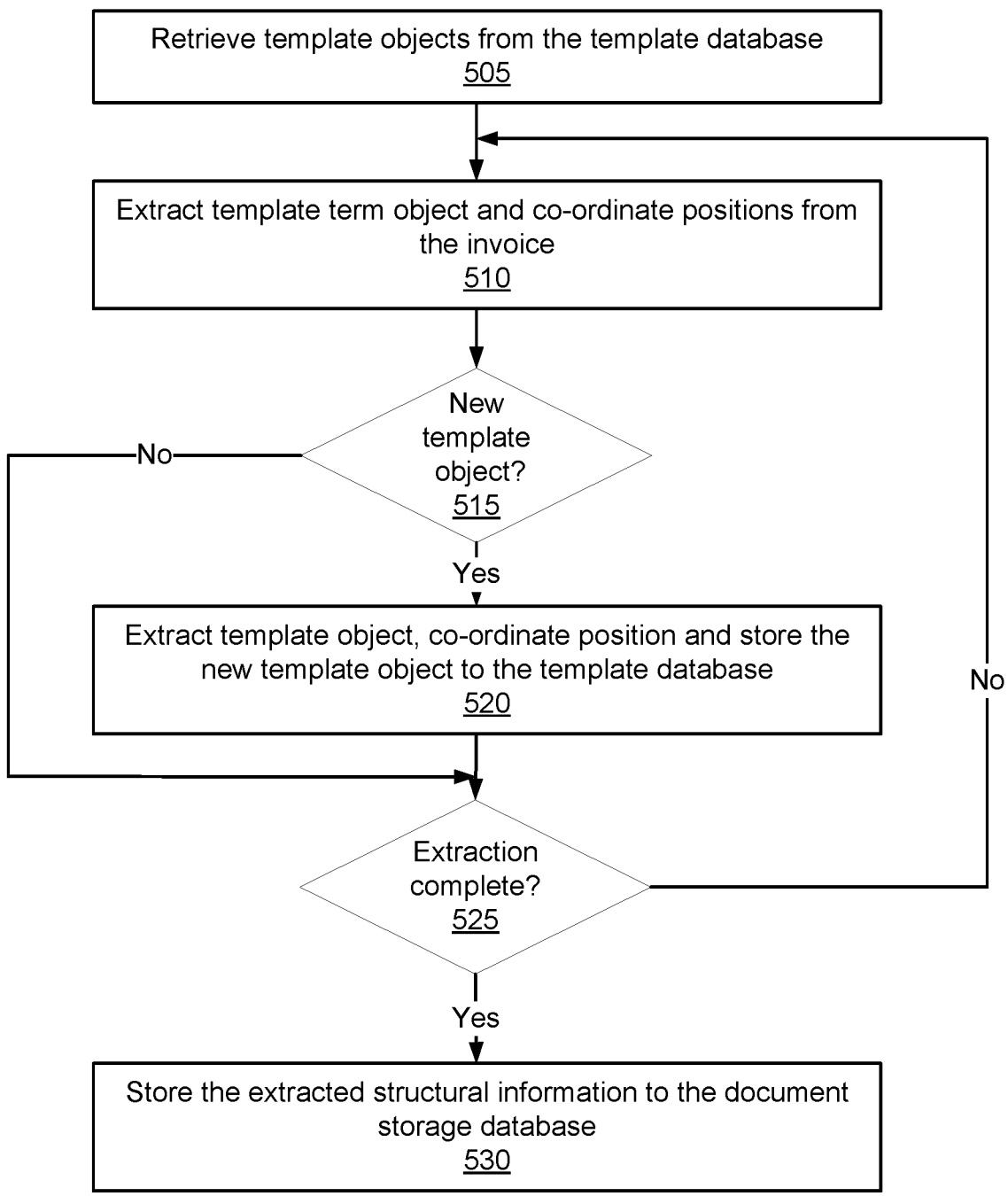
FIG. 5 illustrates an example embodiment of steps performed in extracting structural information from an incoming invoice.

Referring now to FIG. 5, illustrated is an example embodiment of steps performed in extracting structural information from an incoming invoice that does not match 100% to any of the stored invoice binaries/images in the document storage database. To extract the structural information, a list of template objects are retrieved 505 from the template objects database. The template objects may include keywords such as invoice number, reference number, organization name, date, due date, subtotal, tax, total, and other invoice related terms. The document processing system searches for one of the retrieved template objects on the incoming invoice one at a time. If a template object is found on the invoice, the template object is extracted 510. Examples of a template objects include a name, a graphic symbol, an image, an icon or a logo identifying the template object and the location of the template object on the invoice is determined. The determination of location includes recording the X-co-ordinate and Y-co-ordinate of the template term based on the size of the invoice. If a template object is not found on the invoice, or if a new related template object is found 515 such as "bill number", the new template object is learnt and stored 520 in the template object database. In some embodiments the template object corresponds to a field on the invoice. In some embodiments, a new image or logo may be identified, learnt and stored in the template database 220. Once the known and new template object information (template objects and their location) termed as the structural information is extracted 525, it is stored 530 in the document storage database.

Computing Machine Architecture

Figure 6:
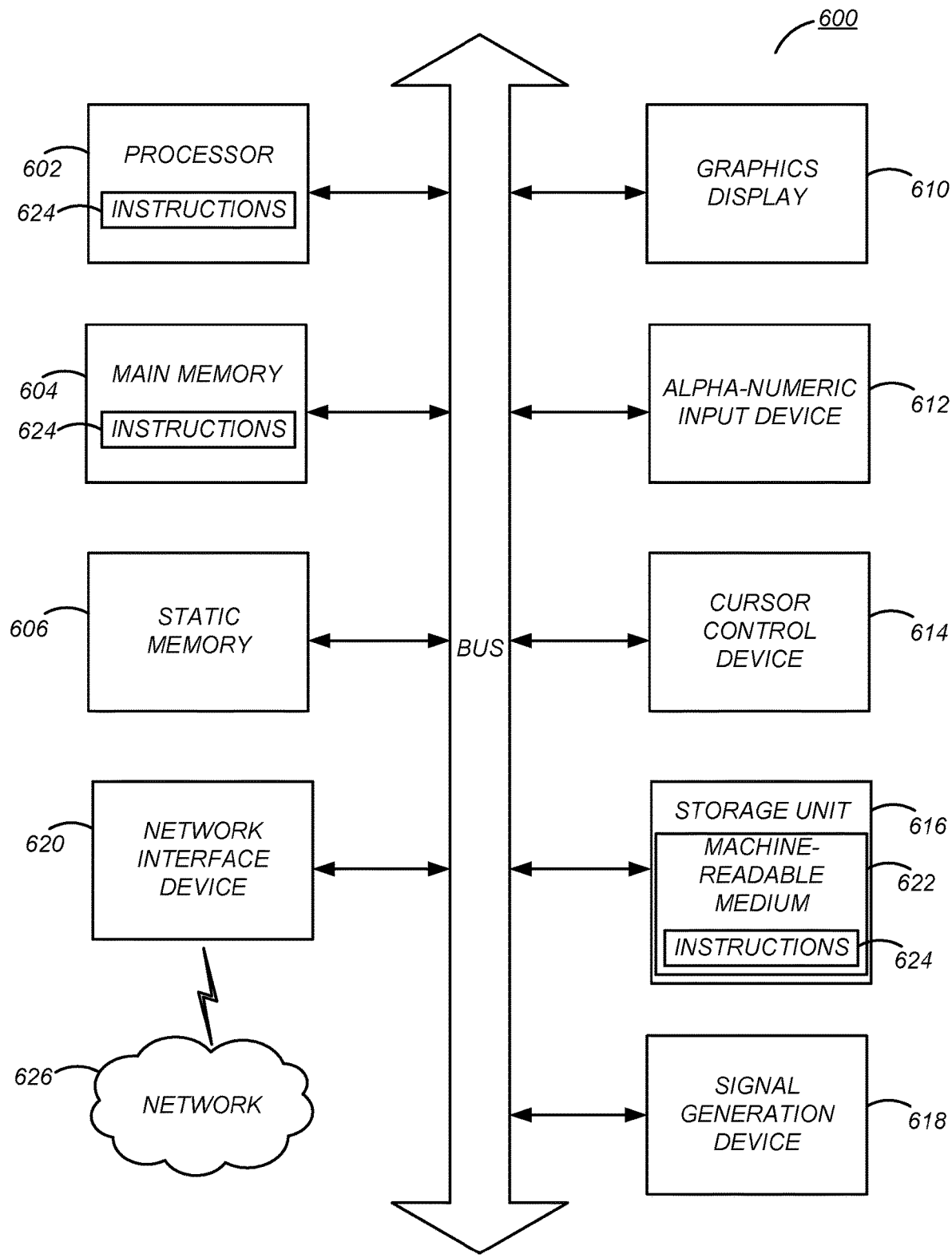
FIG. 6 illustrates one embodiment of components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which one or more instructions 624 (e.g., software, program code or program product) for causing the machine to perform any one or more of the processes (or methodologies), e.g., with FIGS. 1-5, discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Example benefits and advantages of the disclosed configurations include automatic detection of a document, processing the document based on known and learnt information about a document of a business entity. The primary benefit of automating document processing such as invoice processing is that it makes it easier for business entities to manage their finances, automating invoice capturing and organizing speeds up the process and is less prone to human errors, thus making the business finance handling efficient. Additionally it frees up a business entities time to perform more productive functions of the business. The document processing system supports services for all sizes of business entities, thus making it scalable in case a business entity grows over time. The document processing system is not limited to processing invoices; it can be extended to detect and process other types of documents such as legal documents, bank statements, sales orders, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and further elaborated on with FIGS. 3 through 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate additional alternative structural and functional designs for a system and a method for processing a document that can be used to detect, retrieve, tag and process a document for a business entity through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for automating document processing, the method comprising:
    receiving a first plurality of documents, each document having a format specific for a particular entity, at least two entities unrelated to each other;
    determining structural information of each respective document of the first plurality by detecting a respective template object and its respective location on the respective document;
    retrieving, from a database, respective structural information of each of a second plurality of documents, wherein the respective structural information includes a respective template object and its respective location on its respective document; and
    for each received document of the first plurality:
        comparing, based on a matching criterion, the respective location of the template object from the structural information of the received document to each of the template objects from the structural information of each retrieved document of the second plurality, to find a potential matching document;
        in response to finding, based on the comparing, a document that matches the received document within a predefined threshold range, extracting data from the received document and additional structural information from the matched document to process the received document; and
        transmitting the processed document to an entity for review and approval.

2. The method of claim 1, further comprising extracting additional structural information of the received document in response to not finding a document that matches the received document within a predefined threshold range.

3. The method of claim 2, further comprising identifying a new template object from the received document.

4. The method of claim 1, further comprising applying the data extracted from the received document to a corresponding field extracted from the matched document.

5. The method of claim 1, further comprising determining an amount to be paid to at least one of a business entity or a vendor on a date indicated by a due date.

6. The method of claim 1, wherein the detecting of the respective location of a template object further includes determining co-ordinate values of the respective location.

7. The method of claim 1, further comprising determining that the respective structural information of each retrieved document of the second plurality reaches a predefined first threshold success match when compared to the determined structural information of the received document.

8. The method of claim 7, further comprising adding each retrieved document of the second plurality which are determined to be a successful match to a list of potential matches.

9. The method of claim 8, further comprising determining that the structural information of a document retrieved from the list of potential matches reaches a predefined second threshold success match when compared to the structural information of the received document.

10. The method of claim 1, wherein approval metrics are stored in a template term database, wherein the approval metrics include an approved set of template objects and related information based on the review of the processed document.

11. The method of claim 1, further comprising identifying a graphic symbol of an entity as matching criteria for the received document.

12. The method of claim 11 wherein the graphic symbol is described by a set of descriptors and homographic information related to the bitmap of the graphic symbol.

13. A non-transitory computer readable medium comprising stored instructions executable by a processor, the instructions when executed causes the processor to:

receiving a first plurality of documents, each document having a format specific for a particular entity, at least two entities unrelated to each other;

determining structural information of each respective document of the first plurality by detecting a respective template object and its respective location on the respective document;

retrieving, from a database, respective structural information of each of a second plurality of documents, wherein the respective structural information includes a respective template object and its respective location on its respective document; and for each received document of the first plurality:

comparing, based on a matching criterion, the respective location of the template object from the structural information of the received document to each of the template objects from the structural information of each retrieved document of the second plurality, to find a potential matching document;

in response to finding, based on the comparing, a document that matches the received document within a predefined threshold range, extracting data from the received document and additional structural information from the matched document to process the received document; and transmitting the processed document to an entity for review and approval.

14. The computer readable medium of claim 13, further comprising instructions that when executed cause the processor to extract additional structural information of the received document in response to not finding a matching document.

15. The computer readable medium of claim 14, further comprising instructions that when executed cause the processor to identify a new template object from the received document.

16. The computer readable medium of claim 13, further comprising instructions that when executed cause the processor to apply the data extracted from the received document to a corresponding field extracted from the matched document.

17. The computer readable medium of claim 13, further comprising instructions that when executed cause the processor to determine an amount to be paid to at least one of a business entity or a vendor on a date indicated by a due date.

18. The computer readable medium of claim 13, further comprising instructions that when executed cause the processor to determine that the respective structural information of each retrieved document of the second plurality reaches a predefined first threshold success match when compared to the determined structural information of the received document.

19. The computer readable medium of claim 18, further comprising instructions that when executed cause the processor to add each retrieved document of the second plurality which are determined to be a successful match to a list of potential matches.

20. The computer readable medium of claim 19, further comprising instructions that when executed cause the processor to determine that the structural information of a document retrieved from the list of potential matches reaches a predefined second threshold success match when compared to the structural information of the received document.

* * * * *